Patented Apr. 26, 1949

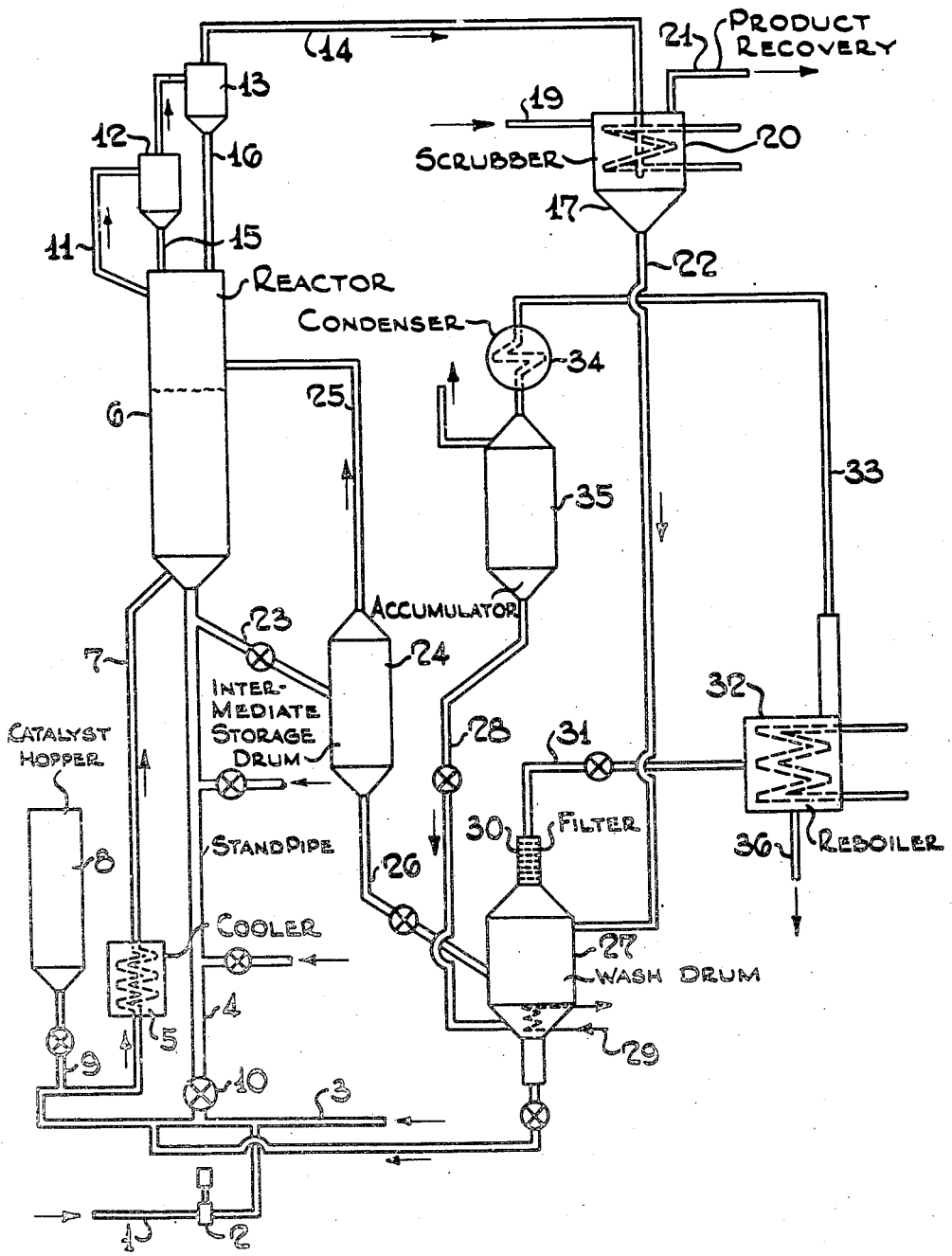

2,468,494

UNITED STATES PATENT OFFICE 2,468,494

HYDROCARBON SYNTHESIS

Lindsay I. Griffin, Jr., Baton Rouge, La., assignor to Standard Oil Development Company, a corporation of Delaware Application December 7, 1944, Serial No. 567,063

2 Claims. (Cl. 260—449.6)

The present invention relates to the manufacture of products by processes involving the interreaction of oxides of carbon and hydrogen resulting in the production of substances such as oxyorganic compounds, for example, methanol and other alcohols, and liquid hydrocarbons. The invention is more particularly concerned with the manufacture of valuable hydrocarbon products containing more than one carbon atom in the molecule by the catalytic hydrogenation of oxides of carbon. The invention is especially concerned with an improved method for controlling the amount of high molecular weight products adsorbed on the catalyst and is to be used in connection with the so-called fluid-solids technique wherein during the synthesis of the hydrocarbons, the catalyst is in the form of powder and is maintained in a dense suspension in the reaction zone intermixed with the reactants. This is accomplished by causing the gaseous reactants to flow upwardly in the reaction zone at a velocity which is sufficent to maintain the catalyst in a turbulent condition within the dense suspension previously referred to. In this type of operation the products obtained in the synthesis, together with any unreacted materials and a small amount of entrained catalyst, issue from a point at the top of the reactor after having passed through several cyclone separators which serve to remove most of the catalyst from the gasiform material by centrifugal action. The catalyst separated by the cyclones is returned to the reaction zone.

In the course of the synthesis, hydrocarbons of a wide range of molecular weight may be formed. The molecular weight varies from that of methane to high boiling materials which at room temperature may exist in solid form and are commonly known as waxes. The operating conditions of temperature and pressure in the reaction zone determine the amount of the heavier hydrocarbons which may be removed as gas with the other gasiform materials leaving the reactor. Under certain conditions of operation the rate of production of the heavier hydrocarbons exceeds the rate of removal with the materials leaving the reactor.) Condensation occurs and these heavier hydrocarbons are then adsorbed on the catalyst in the form of liquids. If the quantity of liquid entrained by the catalyst is allowed to build up, a condition is reached at which the catalyst particles begin to stick together, thereby losing true fluid characteristics. Furthermore, the small amount of catalyst which is not removed from the gases leaving the top of the reactor will also contain liquid materials if such have been deposited thereon in the reactor. The amount of catalyst plus adsorbed liquid removed in this fashion may still be insufficient to prevent further accumulations of liquid on the catalyst without the reactor without reaching the "sticking" non-fluid condition, referred to above. Hence it is necessary to provide for direct removal of catalyst from the reactor, with subsequent removal of the heavy liquids or waxes contained thereon.

It is therefore the main object of this invention to provide a novel process for the removal of these high boiling materials or waxes from the catalyst.

These and other objects of this invention are accomplished in general by removing a portion of the catalyst from the reaction zone to a washing zone in which a liquefied, normally gaseous hydrocarbon, such as butane, is circulated through the catalyst and removed through a filter to a recovery zone where the hydrocarbon is flashed off and the liquid products and wax are recovered as a residue. The liquefied hydrocarbon is condensed and returned to the washing zone for further extraction of the catalyst, while the liquid and wax-free catalyst is at least partially dried and returned to the reaction zone as a suspension in the synthesis gas.

This and other objects of this invention, not at this time more particularly enumerated, will be understood from the following detailed description and drawing. The feed gases comprise hydrogen and carbon monoxide, and the reaction is conducted under conditions to produce hydrocarbon constituents containing more than one carbon atom in the molecule. Referring therefore to the drawing, the synthesis gases are introduced into the system by means of line 1, compressed in compressor 2, may be mixed with recycle gases from line 3, and are then mixed with catalyst from reactor standpipe 4. The mixture is conducted through cooler 5 and introduced into reactor 6 through line 7. Fresh makeup catalyst may be introduced into the catalyst-synthesis gas mixture from catalyst hopper 8 through line 9.

The catalyst suspension is introduced into the lower portion of the reaction vessel and passed upwardly therethrough. Thus the more dense catalyst particles will lag behind the less dense suspending gases or vapors and the catalyst concentration in the reaction zone will therefore be substantially greater than in the suspension of catalyst supplied thereto. It is also generally preferred to pass the gases and/or vapors upwardly through the reaction zone at such a rate that the solid catalyst particles and gases and/or vapors form a dense phase mass which acts as if it had a level similar to a boiling liquid. The catalyst within this mass has a concentration much more dense than the catalyst in the gas and/or vapors above the level. In practice there is a clear line of demarcation between these two phases which produces the level. However, the level is not quiescent but is under agitation similar to the surface of a boiling liquid. The formation of such a dense phase mass with its pseudo level occurs whenever the gas velocity is between 0.1 and 5 feet per second, preferably when the inlet velocity of the gases does not exceed 1.5 feet per second and the outlet velocity is not less than 0.3 feet per second.

The temperature of the reaction zone 6 may be controlled by the amount and temperature of the materials supplied thereto, and/or by heat exchange means, such as cooling coils within the reactor. Since in the processes of this invention, the reactions are generally exothermic, and great increases in temperature in the reaction zone should be avoided, it is one feature of this invention to continuously remove a portion of the dense phase mass of catalyst from the bottom of the reaction zone through standpipe 4 where it is mixed with incoming feed vapors, cooled in exchanger 5 and returned to the reaction zone. Standpipe 4 is a long vertical column which is of sufficient height to provide the desired pressure for circulating the catalyst in accordance with the principles explained in greater detail in U. S. Patent No. 2,360,787. This pressure is similar to the hydraulic or hydrostatic pressure head of a fluid column, the pressure being a direct function of the density of the catalyst powder and of the column height. This device is particularly effective as a means for circulating the catalyst and removing excess heat by heat exchange thus avoiding any apparatus having moving parts from coming in contact with the catalyst. The lower end of column 4 is provided with a suitable valve 10 for regulating the amount of catalyst discharging therefrom. A conventional slide valve having an apertured slide which can be adjusted to regulate the size of the orifice through which the powder passes is suitable for this purpose, although other types of valves may be used. This valve may be operated manually or automatically. A drop in pressure across the valve 10 of about 2 to about 5 lbs. per sq. in. is generally desired in order to provide adequate control of the flow of catalyst powder.

The reaction products and catalyst suspended therein are withdrawn from reaction zone 6 by line 11 and pass into catalyst separating zones 12 and 13. The separators, or cyclones, may be placed within the reaction vessel if desired. The gaseous products are withdrawn through line 14 while catalyst separated from the gases and/or vapors in separators 12 and 13 are returned to the dense phase in reaction zone 6 through lines 15 and 16 respectively. Since gases removed through line 14 still contain small amounts of entrained catalyst particles not removed in separators 12 and 13, the gaseous products are passed to scrubber 17 where they are contacted with an oil introduced through line 19. This oil may be a portion of the condensed products of the reaction or an oil from some source such as gas oil or a light lubricating oil. Scrubber 17 may be cooled by means of coil 20. The oil serves to wash entrained catalyst from the gases and vapors which leave the scrubber through line 21 and are subsequently condensed and fractionated in the usual manner. The oil containing the catalyst washed from the gaseous products leaves the scrubber 17 through line 22 and is subsequently treated as described below.

Returning now to reaction zone 6, under the usual conditions of temperature and pressure maintained, the catalyst in the dense phase mass in the reactor 6 adsorbs some of the heavier hydrocarbon products of the reaction which increase the density of the catalyst and cause it to lose true fluid characteristics. It is therefore the main feature of this invention to periodically or continuously remove a portion of the dense phase catalyst being recycled via standpipe 4 and line 7 and subject it to a treatment whereby these heavier products are removed. This is accomplished according to the present invention by withdrawing a portion of the dense phase catalyst mass through line 23 into intermediate storage drum 24. Effluent gases and/or vapors are returned to the reaction zone 6 from this drum through line 25 while fluidized catalyst is removed through standpipe 26. This standpipe is similar to standpipe 4 and the catalyst falls by gravity flow into wash drum 27 where it is contacted with a liquefied normally gaseous hydrocarbon, such as butane, introduced through line 28 from accumulator 35 into the bottom of wash drum 27. The butane serves to dissolve the liquid and/or wax adhering to the catalyst particles. Residual butane is removed from the wax-free catalyst by means of steam coil 29. Dry wax-free catalyst is withdrawn from the bottom of the wash drum and introduced into feed line 3 whence it is passed together with recycled catalyst from standpipe 4 through cooler 5 and line 7 into reactor 6.

Oil from scrubber 17 is also introduced into wash drum 27 from line 22. This oil mixes with the butane and is withdrawn along therewith through filter 30 which removes any catalyst particles entrained therein. From the wash drum 27, the mixture of butane and oil is passed by way of line 31 to reboiler 32 where the butane is flashed off through line 33, condensed in condenser 34 and returned to accumulator 35. Scrubbing oil and products dissolved from the catalyst are removed from reboiler 32 through line 36.

The reagents, catalysts and operating conditions used in the above described process will naturally be varied according to the nature of the products desired, these conditions being already known. For example, in the synthesis of hydrocarbons from carbon monoxide and hydrogen, the reaction is preferably conducted at substantially atmospheric or moderately elevated pressures with catalyst containing metallic cobalt, iron, nickel or copper which may be in admixture with promotors such as oxides of chromium, zinc, aluminum, magnesium, and the rare earth metals and which may be deposited on carriers such as kieselguhr and pumice and synthetic gels such as the hydrates of silica and/or alumina. The gases are preferably substantially free from sulfur and oxygen and are supplied in a ratio of about one mol of carbon monoxide to two mols of hydrogen, the total gaseous feed containing, for example, above about 24% of carbon monoxide and 48% hydrogen, the remainder being nitrogen or other substantially inert gases. The temperature of reaction may be maintained between 350° and 430° F. with catalysts containing compounds of cobalt and magnesia; with catalysts containing iron, temperatures of between 550° and 650° F. are used. In general the operating temperatures will be between 350° and 700° F., depending on the catalyst and conditions used.

Although the present invention has been described with a certain degree of particularity, it is understood that the present disclosure has been made only by way of example and that numerous changes in the details of operation may be resorted to without departing from the spirit and scope of the invention as hereinafter claimed.

The nature and objects of the present invention having thus been described and illustrated, what is claimed as new and useful and is desired to be secured by Letters Patent is:

1. In a process for the preparation of valuable organic products by the reaction of carbon oxides and hydrogen in the presence of a finely divided fluidized solid catalyst in a reaction zone, the improvement which comprises withdrawing a portion of said fluidized catalyst downwardly from said reaction zone under the pseudo-hydrostatic pressure of said catalyst, continuously withdrawing gaseous and vaporous products and entrained catalyst from the top of said reaction zone, contacting said gases and vapors with oil to separate entrained catalyst, contacting said withdrawn fluidized catalyst with a liquefied normally gaseous hydrocarbon in a washing zone, introducing said oil containing catalyst separated from said gases and vapors into said washing zone, removing liquid normally gaseous hydrocarbon and oil from said washing zone, flashing said liquefied normally gaseous hydrocarbon from said oil, condensing said flashed hydrocarbon and returning it to said washing zone, withdrawing hydrocarbon-free catalyst from said washing zone and recycling said catalyst to said reaction zone.

2. In a process for the preparation of valuable organic products by the reaction of carbon oxides and hydrogen in the presence of a finely divided fluidized solid catalyst in a reaction zone, the improvement which comprises withdrawing a portion of said fluidized catalyst downwardly from said reaction zone under the pseudo-hydrostatic pressure of said catalyst, continuously withdrawing gaseous and vaporous products and entrained catalyst from the top of said reaction zone, contacting said gases and vapors with oil to separate entrained catalyst, contacting at least a portion of said withdrawn fluidized catalyst with a liquefied normally gaseous hydrocarbon in a washing zone, introducing at least a portion of said oil containing catalyst separated from said gases and vapors into said washing zone, removing liquid normally gaseous hydrocarbon and oil from said washing zone, flashing said liquefied normally gaseous hydrocarbon from said oil, condensing at least a portion of said flashed hydrocarbon and returning it to said washing zone, withdrawing substantially hydrocarbon-free catalyst from said washing zone and recycling said catalyst to said reaction zone.

LINDSAY I. GRIFFIN, JR.

REFERENCES CITED

The following references are of record in the file of this patent:

UNITED STATES PATENTS

| Number | Name | Date |
| --- | --- | --- |
| 2,098,766 | Tears | Nov. 9, 1937 |
| 2,266,161 | Campbell | Dec. 16, 1941 |
| 2,326,705 | Thiele | Aug. 10, 1943 |
| 2,341,193 | Scheineman | Feb. 8, 1944 |
| 2,347,682 | Gunness | May 2, 1944 |
| 2,360,787 | Murphree | Oct. 17, 1944 |
| 2,361,978 | Swearingen | Nov. 7, 1944 |
| 2,395,106 | Day et al. | Feb. 19, 1946 |
| 2,407,371 | Jahnig | Sept. 10, 1946 |
| 2,414,736 | Gray | Jan. 21, 1947 |

FOREIGN PATENTS

| Number | Country | Date |
| --- | --- | --- |
| 516,160 | Great Britain | July 23, 1938 |

OTHER REFERENCES

Gregory, "Uses and Applications of Chemicals and Related Materials," 1939, page 120, Reinhold, N. Y.